United States Patent [19]

Ingram

[11] 4,139,963
[45] Feb. 20, 1979

[54] FISHING LURES WITH INTEGRAL HOOK RETAINING MEANS

[76] Inventor: Alexander J. Ingram, 40 Kiln Close, Mevagissey, Cornwall, England

[21] Appl. No.: 757,825

[22] Filed: Jan. 10, 1977

[30] Foreign Application Priority Data

Jan. 9, 1976 [GB] United Kingdom .................. 768/76

[51] Int. Cl.$^2$ ............................................. A01K 85/00
[52] U.S. Cl. .................................... 43/42.03; 43/42.36
[58] Field of Search ................. 43/42.24, 42.03, 42.08, 43/42.35, 42.36, 42.37, 42.49, 44.9

[56] References Cited

U.S. PATENT DOCUMENTS

| 1,497,019 | 6/1924 | Hennings | 43/42.37 |
| 2,106,755 | 2/1938 | McArthur | 43/42.35 |
| 2,119,417 | 5/1938 | Brown | 43/42.37 |
| 2,523,536 | 9/1950 | Maddux | 43/42.03 |
| 2,994,982 | 8/1961 | Murawski | 43/42.35 X |
| 3,218,750 | 11/1965 | Lewin | 43/42.36 X |

FOREIGN PATENT DOCUMENTS 709822  6/1954  United Kingdom .................... 43/42.36

Primary Examiner—Ronald E. Suter

[57] ABSTRACT

A fishing lure in the form of a facsimile fish made of flexible material in which the hook extends through a chamber in the body of the fish, the forward end of the hook being bent so as to engage an abutment in the chamber to prevent the hook being pulled forwardly through the lure and to prevent its rotation. There is also provided a baffle plate at the rear end of the tail to wag the tail from side to side, the baffle plate being attached to the tail at two vertically spaced portions only so as to allow water to freely pass across the baffle plate.

13 Claims, 4 Drawing Figures

FISHING LURES WITH INTEGRAL HOOK RETAINING MEANS

BACKGROUND OF THE INVENTION

The present invention relates to fishing lures. Fishing lures are devices placed adjacent the hook on the end of a fishing line for attracting fish towards the hook. Many forms of lure are known. In some cases shiny pieces of metal are used, in other cases coloured solids are used, in so-called fly fishing feathers or other light material is tied so as to resemble a fly, and in some instances, a fishing lure forming a facsimile fish on which the fish to be caught might feed is provided.

The present invention relates to fishing lures of the last mentioned type.

Such fishing lures are known made of flexible plastics material with a hook having its shank buried within the body of the fish and the line attached to the eye of the hook and protruding from the lure. Conventionally, the barbed section of the hook protrudes from the belly of the fish. There is often provided a cavity within the body of the fish through which the shank portion of the hook projects and problems have arisen with this construction. Sometimes owing to the action of the water, the hook tends to work its way forward in the lure so that the lure slips back around the bend of the hook presenting a misshapen and therefore less desirable lure and also affecting the wriggling action of the fishing lure which may cause the lure to spin in the water and not to maintain a conventional upright position.

With respect to another feature of the lure of the invention, it is known to provide tail portions of relatively flexible plastics material which may wriggle in the water and this wriggling action is enhanced by the provision of a transverse baffle plate at the rear end of the tail. It is necessary for this baffle plate to be largely unobstructed so as to allow the water to pass back and fourth across the baffle plate and for this reason, in the applicant's prior arrangement described in U.S. Ser. No. 659,984 (now U.S. Pat. No. 4,044,492) corresponding to GB Patent Application No. 8516/75 the baffle plate is attached to the tail at its upper point only. Problems have arisen in that in the event of a mis-cast, the line may catch in the gap between the tail and the baffle plate. There is also a problem regarding the strength of the joint between the baffle plate and the tail.

SUMMARY OF THE INVENTION

The present invention provides a fishing lure of flexible material in the shape of a facsimile fish comprising a body portion and a tail portion, a chamber being provided in the body portion, the cross section of the chamber being narrower in width than in height, the chamber having a first aperture communicating with the mouth of the facsimile fish through which the fishing line extends, and a second aperture in the belly of the facsimile fish, an abutment being provided in the wall of the chamber at the front end of the chamber, and a hook, the barbed end of which extends out of the chamber through the second aperture, the front end of the hook including an eye for attachment to the line, and a portion extending generally vertically from the axis of the hook for engagement with the abutment in the wall of the chamber, the hook at the position of the vertically extending portion having a greater maximum cross section than the width of the chamber whereby said generally vertically extending portion engages the abutment to restrain the hook from being pulled forwardly out of the first aperture and the vertically extending portion restraining rotation of the hook about its axis.

According to this arrangement, the generally vertically extending portion engages the abutment and thereby prevents the hook moving forward through the body of the lure. The abutment is provided in a relatively thick part of the plastics material of the lure and the effect can be further enhanced by forming the abutment in a V-shape and the front end of the hook including two surfaces for engaging the opposite faces of the V-shaped abutment.

Furthermore, as the maximum cross section of the hook at the front end of the chamber is greater than the width of the chamber, the hook is restrained from rotating in the body of the lure.

In one arrangement the vertically extending portion extends upwardly from the eye of the hook whereby the abutment in the wall at the front end of the chamber is situated towards the top of the chamber, whilst in another arrangement, the vertically extending portion extends downwardly and the abutment is situated towards the bottom of the chamber.

According to a further aspect of the invention, there is provided a fishing lure of flexible material comprising a facsimile fish having a body portion and a tail portion, the tail portion being of generally thinner cross section than the body portion and carrying at the end thereof a transverse baffle plate, the transverse baffle plate extending generally vertically but at a slight rearward angle and being attached to the tail at two spaced vertical points whereby the baffle causes turbulence in the water flow past the facsimile fish to wag the tail.

In this case, the baffle plate and tail portion are strengthened and it is not possible for the fishing line to get caught at this point. However, it is still possible for the water to pass freely across the baffle plate from one side to another as is necessary for the baffle plate to work properly.

BRIEF DESCRIPTION OF THE DRAWINGS

Preferred embodiments of the invention will now be described by way of example only and with reference to the accompanying drawings in which.

The tail portion is of thinner transverse dimension so as to render it flexible particularly in a horizontal direction and carries at its rear end a baffle plate 20. The baffle plate 20 is attached at its upper portion to the tail portion 12 and a finger 21 extends downwardly from the tail portion 12 to connect with the bottom part of the baffle plate 20. As can be seen, the baffle plate 20 extends generally downwardly and rearwardly.

Both the body portion 11 and tail portion 12 carry various fins which tend to maintain the fishing lure in the correct upright position.

Figure 2:
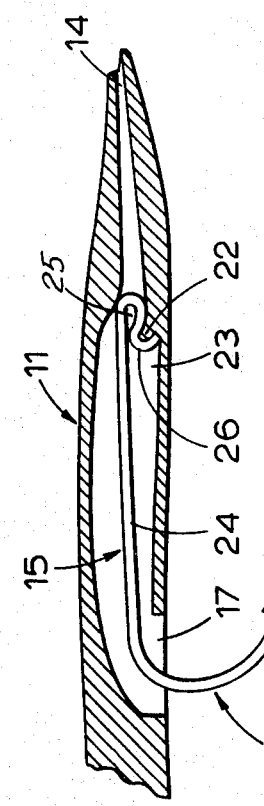
FIG. 2 shows the lure of FIG. 1 partially vertically sectioned showing the chamber and the shank of the hook within the chamber.

Referring to FIG. 2, there is shown a vertical section through the body portion to reveal the interior chamber 15. It will be noted that this chamber 15 communicates with the first aperture or mouth 14 and the second aperture 17.

Figure 1:
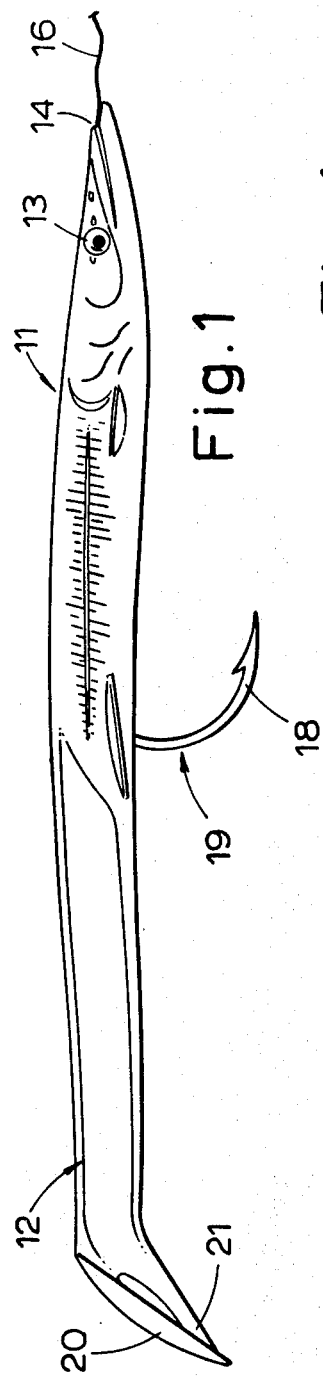
FIG. 1 comprises a side view of a complete lure according to the invention.
Figure 4:
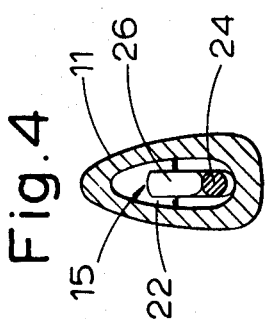
FIG. 4 shows a transverse vertical section on the lines X—X of FIG. 3, and, Referring to FIG. 1 there is shown a fishing lure made of flexible plastics material in the shape of a facsimile fish comprising a body portion 11 and a tail portion 12. The body portion includes eyes 13 and a first aperture in the form of a mouth 14, the mouth 14 communicating with an interior chamber 15 shown in later figures from which protrudes a fishing line 16. In the belly of the body portion is provided a second rectangular section aperture 17 from which protrudes a barbed portion 18 of a hook member 19.

The shape of the chamber 15 will be clear from FIG. 4. At the forward end of the chamber beyond the head of the hook, the chamber narrows to form a small aperture through which the fishing line may pass. However, adjacent the head of the hook member 19, there is provided an abutment 22 adjacent the lower part of the chamber. The abutment 22 is V-shaped in vertical section as is clear from FIG. 2 and is provided by forming a small indentation 23 in the base of the chamber. As is clear from FIG. 4 the chamber 15 is considerably taller than its width and it will be noted that adjacent the abutment 22, the plastics material is relatively thick.

As is also clear from FIG. 2, the hook member, which is made of thick stiff wire comprises, in addition to the barbed portion 18 already described a shank portion 24, the front end of which is bent downwardly and rearwardly so as to form an eye 25 and a vertically extending downwardly directed portion 26. The portion 26 is formed by bending the end of the hook beyond the eye back towards the mouth of the fish so as to provide a V-shaped socket which may engage the abutment 22.

Figure 3:
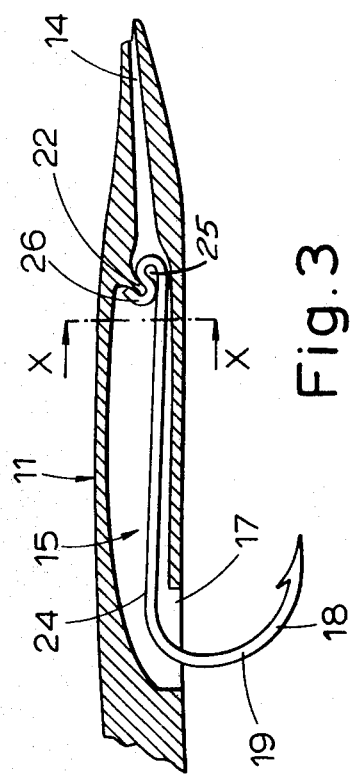
FIG. 3 shows a view similar to FIG. 2 of an alternative embodiment of the invention.

FIG. 3 shows an alternative arrangement of the chamber 15 and hook member 19 in which the vertically extending portion 26 extends upwardly from the shank of the hook and the abutment 22 and indentation 23 are provided at the upper side of the chamber 15. This is preferred since in the arrangement of FIG. 2, the portion 26 protrudes rather close to the surface of the body portion 11. A further advantage of the FIG. 3 arrangement is that when a pull or tension is exerted on the line the portion 26 is held back against the abutment 22. This in turn holds the hook shank down hard against the lower side of the cavity keeping the hook point fully extended from the second aperture 17 in the belly.

In operation, the line is attached to the eye 25 of the hook member 19 and the leading end of the line 16 is then passed through the rectangular second aperture 17 through the chamber 15 and out through the mouth 14 of the lure. This pulls the eye 25 of the hook into the rectangular aperture 17 which is shaped so as to receive the eye and the portion 26 and the hook is then worked forward until the portion 26 engages the abutment 22. This corresponds to the position shown in FIGS. 2 and 3.

In use the hook cannot move forwardly of the point shown in FIGS. 2 and 3 since the portion 26 abuts the abutment 22 which is closely supported by a relatively massive portion of the plastics material of the lure and furthermore the hook member 19 cannot rotate abouts its shank portion 24 since the portion 26 is too long to be able to extend transversely along the chamber 15. The problems outlined in the introduction are therefore overcome.

Furthermore, by virtue of the arrangement of the baffle plate 20, water can flow readily across the baffle plate 20 since the majority of the surface of the baffle plate 20 is quite free but it is not possible for the line to snag with the baffle plate. In addition, the baffle plate is more strongly supported than in the prior arrangement.

The fishing lure described has been found to work particularly well in practice with widespread success. It is inherently attractive to fish and cannot ride back along the hook nor can the line snag the baffle plate, both of which would produce a deformed appearance of the lure.

I claim:

1. A fishing lure of flexible material in the shape of a facsimile fish comprising a body portion having a mouth and a belly and a tail portion, a chamber being provided in the body portion, the cross section of the chamber being narrower in width than in height, the chamber having a first aperture communicating with the mouth of the facsimile fish provided at the front thereof through which a fishing line may extend, and a second aperture in the belly of the facsimile fish, an abutment being provided in a wall of the chamber adjacent the first aperture, and a hook having a barbed end which extends out of the chamber through the second aperture, a front end of the hook including an eye within the chamber for attachment to the line, and a portion adjacent the eye extending generally vertically from a shank of the hook and sloping towards the mouth of the fish to form a V-shaped groove for engagement with the abutment in the wall of the chamber, the hook at the position of the vertically extending portion having a greater maximum cross section than the width of the chamber whereby said generally vertically extending portion engages the abutment to prevent the hook being pulled forwardly out of the first aperture and the vertically extending portion prevents rotation of the hook about its shank.

2. A fishing lure as claimed in claim 1 in which the vertically extending portion extends upwardly from the eye of the hook and the abutment in the wall at the front end of the chamber is situated towards the top of the chamber.

3. A fishing lure as claimed in claim 1 in which the vertically extending portion extends downwardly from the eye of the hook and the abutment in the wall at the front end of the chamber is situated towards the bottom of the chamber.

4. A fishing lure as claimed in claim 1 in which the second aperture comprises a slot extending parallel to an axis of the facsimile fish.

5. A fishing lure as claimed in claim 1 in which the abutment comprises a V-shaped abutment and said portion includes two surfaces for engaging the two opposite faces of the V-shaped abutment.

6. A fishing lure of flexible material comprising a facsimile fish having a body portion and a tail portion, the tail portion being of generally thinner cross section than the body portion and carrying at the end thereof a transverse baffle plate, the body, tail and baffle plate being integral and of the same material, the transverse baffle plate extending generally vertically but at a slight rearward angle whereby the baffle causes turbulence in the water flow to wag the tail and being attached to the tail at two spaced points, one adjacent the top and the other adjacent the bottom of the baffle plate whereby the water can pass freely through the space and over the baffle plate from one side of the tail to the other.

7. A fishing lure as claimed in claim 6 in which the body portion incorporates a chamber, the cross section of the chamber being narrower in width than in height, the chamber having a first aperture communicating with a mouth of the facsimile fish provided at the front thereof through which a fishing line may extend, and a second aperture in a belly of the facsimile fish, an abutment being provided in a wall of the chamber adjacent the first aperture, and a hook, a barbed end of which extends out of the chamber through the second aperture, a front end of the hook including an eye within the chamber for attachment to the line, and a portion adjacent the eye extending generally vertically from a shank of the hook and sloping towards the mouth of the fish to form a V-shaped groove for engagement with the abutment in the wall of the chamber, the hook at the position of the vertically extending portion having a greater maximum cross section than the width of the chamber whereby said generally vertically extending portion engages the abutment to prevent the hook being pulled forwardly out of the first aperture and the vertically extending portion prevents rotation of the hook about its shank.

8. A fishing lure of flexible material in the shape of a facsimile fish comprising an elongated body portion including a mouth and a belly and a tail portion, an axially elongated chamber in said body portion, a first aperture in said body portion extending from said chamber and terminating proximate said mouth of said facsimile fish for receiving a fishing line therethrough, a second aperture in said body portion extending from said chamber and terminating in said belly of said facsimile fish, an abutment integral with a wall of said chamber and a hook having a first, barbed end which extends through said second aperture and which is positioned externally of said body portion, a central shank portion and a second end having an eye for attachment to the fishing line, all of said hook with the exception of said first, barbed end being loosely and completely contained within said body portion, said eye being defined by a first section bent in a direction away from said mouth, said hook further including a second section bent in the form of a groove for engaging said abutment to prevent said hook from being pulled forwardly out of said first aperture.

9. A fishing lure as claimed in claim 8 wherein said chamber has a cross section that is narrower in width than in height and said second section has a dimension greater than the width dimension of said chamber to thereby prevent rotation of said hook about said shank.

10. A fishing lure as claimed in claim 8 wherein said abutment is positioned on a wall of said chamber that is remote from said belly.

11. A fishing lure as claimed in claim 8 wherein said abutment is positioned on a wall of said chamber that is adjacent said belly.

12. A fishing lure as claimed in claim 9 wherein said abutment and said second section are both V-shaped.

13. A fishing lure as claimed in claim 8 wherein said second section is contiguous with and in the same plane as said first section.

* * * * *